United States Patent
Brockmann et al.

(10) Patent No.: US 8,250,246 B2
(45) Date of Patent: Aug. 21, 2012

(54) LOADING AND EXECUTING FIRMWARE MODULE WITHOUT RESETTING OPERATION

(75) Inventors: Mark D. Brockmann, Scotts Valley, CA (US); Lucy G. Hosking, Santa Cruz, CA (US); Gayle L. Noble, Boulder Creek, CA (US)

(73) Assignee: Finisar Corporation, Sunnyvale, CA (US)

( * ) Notice: Subject to any disclaimer, the term of this patent is extended or adjusted under 35 U.S.C. 154(b) by 251 days.

(21) Appl. No.: 12/170,046

(22) Filed: Jul. 9, 2008

(65) Prior Publication Data

US 2010/0011134 A1 Jan. 14, 2010

(51) Int. Cl.
*G06F 3/00* (2006.01)
*G06F 9/44* (2006.01)

(52) U.S. Cl. .......................................... 710/14; 717/168
(58) Field of Classification Search .................. None
See application file for complete search history.

(56) References Cited

U.S. PATENT DOCUMENTS

| | | | |
|---|---|---|---|
| 6,631,520 B1 * | 10/2003 | Theron et al. ............... 717/173 |
| 6,996,635 B2 * | 2/2006 | Goodman et al. ............ 710/5 |
| 7,103,687 B2 * | 9/2006 | Farkas et al. ................. 710/104 |
| 7,146,609 B2 * | 12/2006 | Thurston et al. ............. 717/169 |
| 7,269,191 B2 * | 9/2007 | Stewart et al. ............... 372/34 |
| 7,308,516 B2 * | 12/2007 | Dressen et al. .............. 710/110 |
| 7,340,594 B2 * | 3/2008 | First et al. ................... 713/2 |
| 7,342,649 B2 * | 3/2008 | Waibel ........................ 356/5.01 |
| 7,546,596 B2 * | 6/2009 | Needham ..................... 717/169 |
| 2007/0285689 A1 * | 12/2007 | Hozumi ....................... 358/1.9 |

* cited by examiner

*Primary Examiner* — Eron J Sorrell
*Assistant Examiner* — Dayton Lewis-Taylor
(74) *Attorney, Agent, or Firm* — Maschoff Gilmore & Israelsen

(57) ABSTRACT

A host communicates a firmware module to an electronic device utilizing a data communication interface (e.g., I²C). The host may also communicate a set of values representing information associated with execution of the firmware module to the electronic device. The host may utilize commands and/or flags to execute the firmware module at the electronic device. The electronic device executes the firmware module without resetting/suspending an ongoing execution of the electronic device. In some embodiments, the electronic device collects data upon execution of the firmware module. The collected data may be stored to a particular location of the electronic device and retrieved later by the host, or returned directly to the host.

20 Claims, 6 Drawing Sheets

LOADING AND EXECUTING FIRMWARE MODULE WITHOUT RESETTING OPERATION

BACKGROUND OF THE INVENTION

1. The Field of the Invention

The present invention relates to optoelectronic communication systems. More particularly, embodiments of the invention relate to systems and methods for creating firmware modules that can be loaded and executed by an electronic module without resetting the electronic module.

2. The Relevant Technology

Computing and networking technology have transformed our world. As the amount of information communicated over networks has increased, high-speed transmission has become ever more critical. Many high-speed data transmission networks rely on optoelectronic devices, including optoelectronic transceivers and transponders, and similar devices for facilitating transmission and reception of digital data embodied in the form of optical signals over optical fibers. Optical networks are thus found in a wide variety of high-speed applications in networks of all sizes.

Typically, data transmission in such networks is implemented by way of an optical transmitter (also referred to as an electro-optic transducer), such as, for example a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

The characteristics of an optical transmitter and receiver are changed over operational conditions like temperature and voltage. For example, the threshold current and slope efficiency of a laser diode change over temperature. To ensure the quality and integrity of data transmission, various measurement and compensation circuits are employed by an optoelectronic device to compensate for these changes. Furthermore, an optoelectronic device with digital diagnostics features may need to communicate with hosting equipment in a protocol defined by an applicable multi source agreement ("MSA") specification, such as the small form-factor pluggable (SFP) transceiver MSA and 10-gigabit small form-factor pluggable (XFP) transceiver MSA.

The measurement, compensation, diagnostics, communication, and potentially other functions are typically controlled and/or implemented in part by a microcontroller and its associated embedded software (hereinafter referred to as "firmware"). The firmware is typically designed in a modular form for ease of maintenance and contains multiple firmware modules with each handling one of the above functions. For example, the firmware may include an acquisition module for sequencing an analog-to-digital converter (ADC) to measure multiple analog input signals one by one. It may also have a calibration module that adopts certain algorithms to eliminate errors of various component parameters, e.g., temperature coefficient of a thermistor sensing the operational temperature. The firmware may further contain a logic evaluation module that assesses the calibrated parameters in real time and triggers a control action upon crossing preset alarm and warning thresholds, or simply leaves the calibrated parameters and alarm and warning flags to a communication module for queries initiated by host equipment. All these firmware modules are executed by a microcontroller or the like which typically contains only one or two CPUs due to the restrictions of component cost.

Typically, analysis and testing of optoelectronic devices require an associated firmware code to extract debug information when an error is encountered in the optoelectronic device. The debugging process may necessitate loading of a new or an updated firmware code to take an appropriate debug action for the encountered error. Existing systems and methods facilitate loading of new firmware onto the optoelectronic device, which can be executed only after resetting the optoelectronic device. However, the resetting removes the error condition being analyzed during the debugging operation. Such removal of an error condition may be undesirable, especially when the occurrence of a particular type of error is rare or not frequently repeated.

In addition, a topical analysis may be performed in a development environment by executing the firmware code while the optoelectronic device is running. However, some bugs do not show up or are not reproducible during the topical analysis. Hence, it may be difficult to look into the firmware code while it is executing and a run-time gathering of debug information is necessitated.

While discussed in the context of optoelectronic devices, similar problems may occur with SAS and SATA modules. Thus, what are needed are improved methods and systems for creating, loading and executing firmware modules, without resetting them, in optoelectronic, SAS/SATA, and other electronic devices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Briefly, embodiments of the present invention are directed to systems and methods for creating, loading, and executing firmware modules in electronic devices. In particular, embodiments of the invention enable loading of the firmware module onto the electronic device without resetting the operations of a firmware in the electronic device.

According to one embodiment, a method for loading a firmware module onto an electronic device includes communicating the firmware module and a corresponding set of values to the electronic device through a data communication interface. The firmware module is executable at the electronic device without suspending operation(s) of a firmware in the electronic device. The set of values can represent information associated with execution of the firmware module. The firmware module may be a complete linked code set or a portion of a linked code set.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to creating, loading, and executing a firmware module in an electronic device. As used herein, the term "electronic device" broadly covers devices having electronic components, such as optoelectronic devices, including transponders, transceivers, transmitters, and receivers, as well as SAS and SATA modules, and other modules not explicitly identified herein. In one example embodiment, disclosed systems and methods enable loading and execution of configurable firmware modules without interrupting an ongoing execution of a firmware in an optoelectronic or electronic device. In the following description, an example operational optoelectronic device environment will first be described. Then, operation in accordance with embodiments of the invention will be described with respect to the operational environment.

Figure 1:
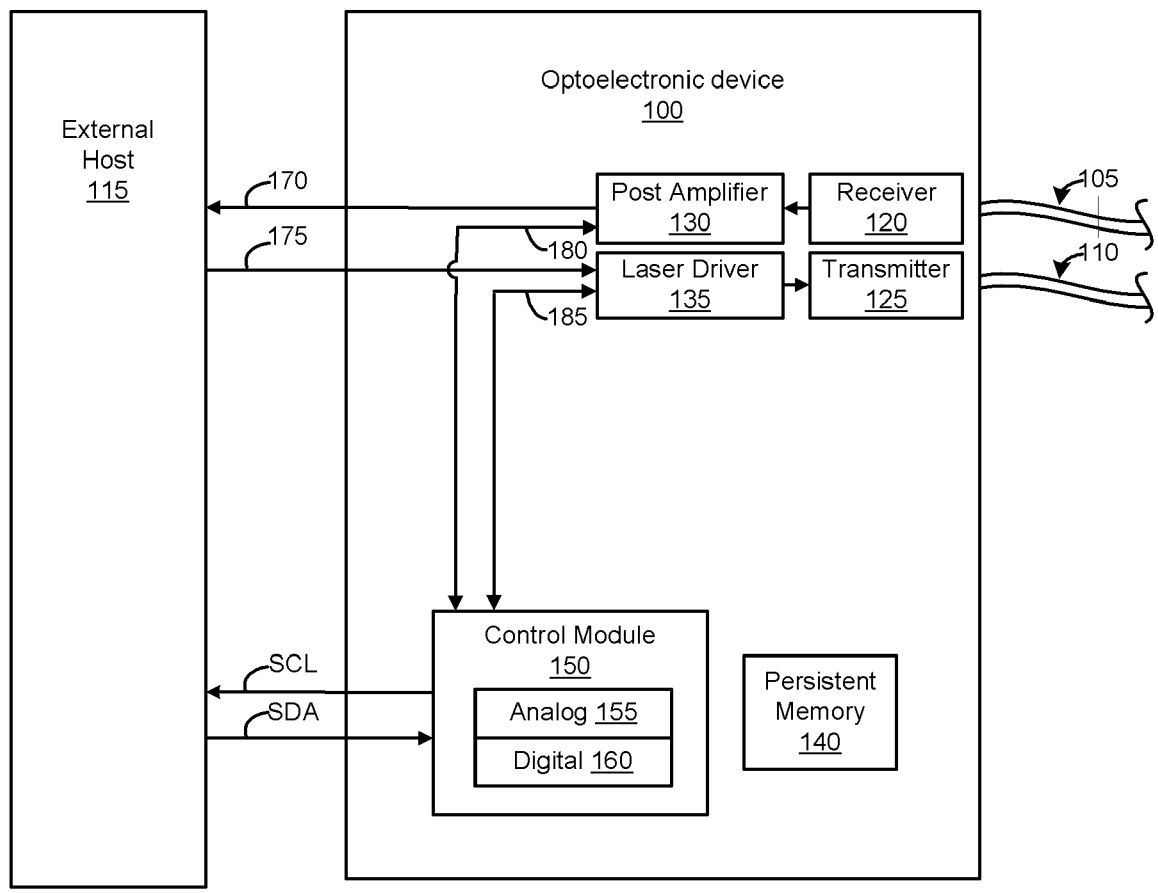
FIG. 1 schematically illustrates an example of an optoelectronic device that may implement features of the present invention.

FIG. 1 illustrates an example optoelectronic device 100 in which the principles of the present invention may be employed, implemented herein as an optoelectronic transceiver module 100. While the optoelectronic device 100 will be described in some detail, the optoelectronic device 100 is described by way of illustration only, and not by way of restricting the scope of the invention. The principles of the present invention are suitable for 1G, 2G, 4G, 8G, 10G, and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optoelectronic transceiver environment at all. For instance, as already mentioned, the principles of the present invention can be implemented in electronic devices other than optoelectronic modules, such as Serial Advanced Technology Attachment (SATA) or Serial Attached SCSI (SAS) devices.

In operation, the optoelectronic device 100 receives an optical signal from fiber 105 using a receiver 120. The receiver 120 acts as an opto-electric transducer by transforming the optical signal into an electrical signal. The receiver 120 provides the resulting electrical signal to a post-amplifier 130. The post-amplifier 130 amplifies the electrical signal and provides the amplified signal to an external host 115 as represented by arrow 170. The external host 115 may be any computing system capable of communicating with the optoelectronic device 100. The term "host" and "external host" are used interchangeably in this description.

The optoelectronic device 100 may also receive electrical signals from the host 115 for transmission onto a fiber 110. Specifically, a laser driver 135 receives an electrical signal from the host 115 as represented by arrow 175, and drives a transmitter 125 (e.g., a laser or Light Emitting Diode (LED)) to emit optical signals onto the fiber 110, where optical signals are representative of the information in the electrical signal provided by the host 115. Accordingly, the transmitter 125 serves as an electro-optic transducer.

The behavior of the receiver 120, the post-amplifier 130, the laser driver 135, and the transmitter 125 may vary dynamically due to a number of factors. For example, temperature changes, power fluctuations, and feedback conditions may each affect the performance of these components. Accordingly, the optoelectronic device 100 includes a control module 150, which may evaluate operating conditions, such as, but not limited to, temperature, voltage, and low frequency changes (such as receive power) from the post-amplifier 130 (as represented by arrow 180) and/or from the laser driver 135 (as represented by arrow 185). This allows the control module 150 to optimize the dynamically varying performance, and additionally detect when there is a loss of signal.

Specifically, the control module 150 may counteract these changes by adjusting settings on the post-amplifier 130 and/or the laser driver 135 as also represented by the arrows 180 and 185. These settings adjustments may be quite intermittent since they are only made when operating conditions so warrant. Although not required in all embodiments, the control module 150 may include both an analog portion 155 and a digital portion 160. Together, portions 155 and 160 allow the control module 150 to implement logic digitally, while still largely interfacing with the rest of the optoelectronic device 100 using analog signals. The control module 150 can communicate with the host 115 using, for example, a two-wire I²C Interface shown as serial data (SDA) and serial clock (SCL) lines.

As illustrated in FIG. 1, the I²C host interface is a hardwired link that can be used for, among other things, loading firmware onto the optoelectronic device 100, as will be described in greater detail below. Alternately or additionally, the principles of the present invention can be implemented over a wired link or a wireless link to the optoelectronic (or other) device. Use of a wireless link with the optoelectronic device 100 may enable, for instance, the ability for a field engineer to query the device, download debug firmware to the device, gather information, and the like or any combination thereof, without ever opening a rack or trying to establish a hardwired connection in a potentially constrained space.

The control module 150 may have access to a persistent memory 140, which in one embodiment, is an Electrically Erasable and Programmable Read Only Memory (EEPROM), although this is not required in all embodiments. The persistent memory 140 and the control module 150 may be packaged together in the same package or in different packages without restriction. The persistent memory source 140 can be either a volatile or a non-volatile memory. Alternately or additionally, the control module 150 may have access to random access memory (RAM) or other volatile memory which can be included within the optoelectronic device 100 and/or the control module 150.

Figure 2:
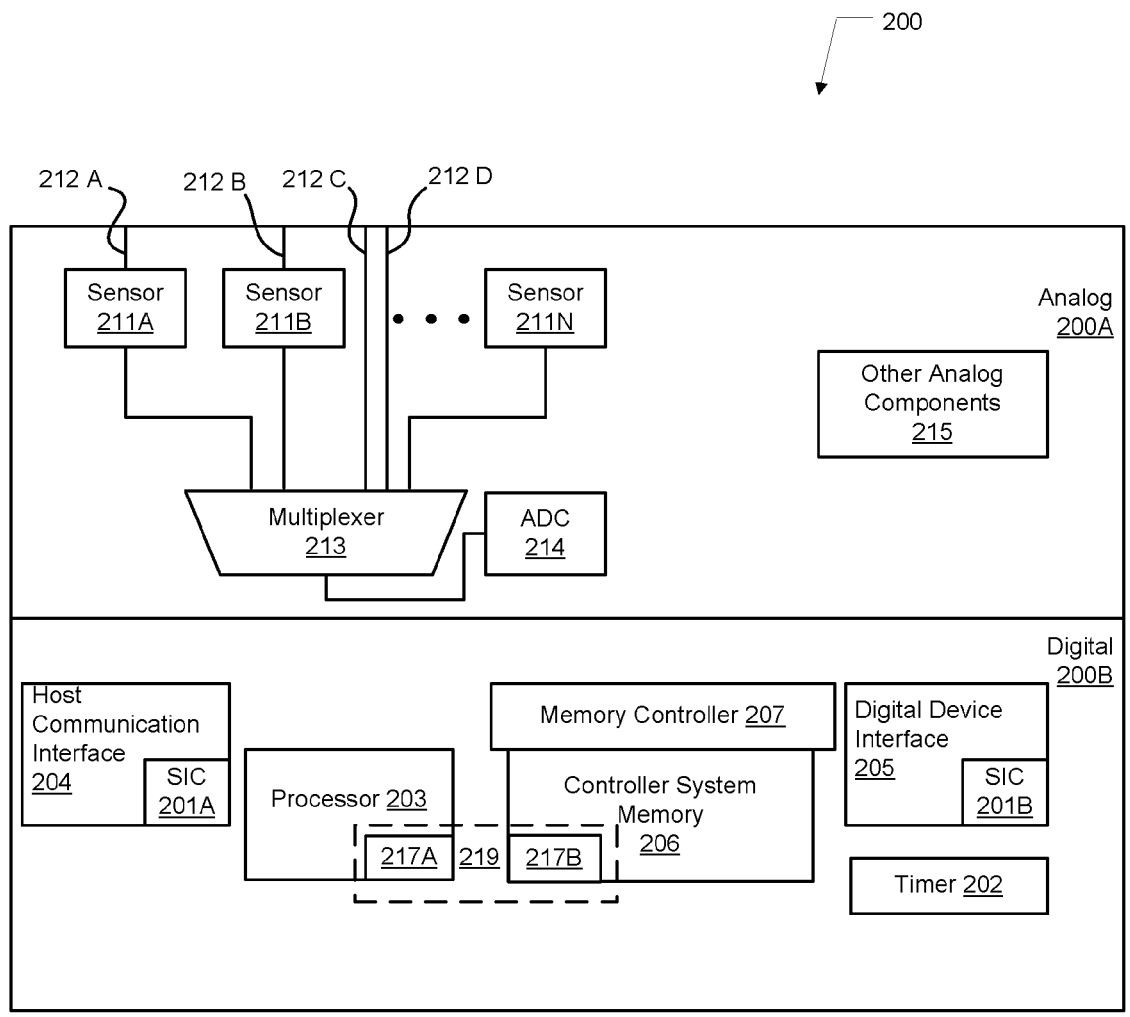
FIG. 2 schematically illustrates one embodiment of the control module of FIG. 1 in further detail.

FIG. 2 schematically illustrates an example of a control module 200 in further detail, which may correspond to the control module 150 of FIG. 1. The control module 200 includes an analog portion 200A that represents an example of the analog portion 155 of FIG. 1, and a digital portion 200B that represents an example of the digital portion 160 of FIG. 1. The analog portion 200A includes sensors 211A, 211B to 211N. The sensors can receive information on operational parameters internally of the control module 200 such as, for example, supply voltage and transceiver temperature. The sensors can also receive external analog or digital signals from other components of the optoelectronic device 100 that indicate other operational parameters such as, for example, laser bias current, transmit power, receive power, laser wavelength, laser temperature, and Thermo Electric Cooler (TEC) current. Two external lines 212A and 212B are illustrated for receiving such external analog signals although there could be many of such lines. The control module 200 can also receive operational parameters from sensors located outside of the control module 200, which is represented by lines 212C and 212D.

The sensors 211A, 211B to 211N may generate analog signals that represent the measured values. In addition, externally provided signals 212A, 212B, 212C, 212D may also be analog signals. In this case, the analog signals are converted to digital signals to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, all analog signals may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

The analog portion 200A of the control module 200 may also include other analog components 215 such as, for example, digital to analog converters, other analog to digital converters, high-speed comparators (e.g., for event detection), voltage based reset generators, voltage regulators, voltage references, clock generator, and other analog components.

The digital portion 200B of the control module 150 may include a timer module 202 that provides various timing signals used by the digital portion 200B. Such timing signals may include, for example, programmable processor clock signals. The timer module 202 may also act as a watchdog timer. Further, a general-purpose processor 203 may also be included. The processor 203 recognizes instructions that follow a particular instruction set, and may perform normal general-purpose operation such as shifting, branching, adding, subtracting, multiplying, dividing, Boolean operations, comparison operations, and the like.

A host communication interface 204 can also be included in the digital portion 200B, which is used to communicate with the host 115 (depicted in FIG. 1 as lined SDA and SCL). It is to be understood that other host communication interfaces may also be implemented. The control module 200 transmits data to the host 115 using the host communication interface 204 to allow for digital diagnostics and readings of temperature levels, transmit/receive power levels, and the like. An external device interface 205 is used to communicate with, for example, other external components of the optoelectronic device 100 such as, for example, the post-amplifier 130, the laser driver 135, and/or the persistent memory 140.

An internal controller system memory 206 (not to be confused with the external persistent memory 140) can also be included in the digital portion 200B which may be a Random Access Memory (RAM) or non-volatile memory. A memory controller 207 shares access to the controller system memory 206 with the processor 203, the host communication interface 204, and the external device interface 205. In one embodiment, the host communication interface 204 includes a serial Interface controller (SIC) 201A and the external device interface 205 includes a serial interface controller (SIC) 201B. The two serial interface controllers 201A and 201B may communicate using a two-wire interface such as $I^2C$ or any other interface recognizable by both communicating modules. This enables the two serial interface controllers (SICs) 201A and 201B to operate in a master/slave relationship, which configuration is known by those skilled in the art and will not be discussed in detail.

Having described a specific environment with respect to FIGS. 1 and 2, it will be understood that this specific environment is only one of countless hardware and software architectures in which the principles of the present invention may be employed. As previously stated, the principles of the present invention are not intended to be limited to any particular environment.

The control module 200 can control and/or implement measurement, compensation, diagnostics, communication, and potentially other functions of the optoelectronic device 100. Such control and implementation by the control module 200 may be facilitated in part by associated embedded software (referred to as "firmware"). The firmware is typically designed in a modular form for ease of maintenance and can include multiple firmware modules with each handing one of the above functions. Alternately or additionally, the firmware module may be a complete linked code set dynamically allocated or just a portion of the complete linked code set.

In accordance with one embodiment, the host 115 as depicted in FIG. 1 communicates via a data communication interface that has associated with it a set of commands conforming to a communication protocol (e.g., Inter-Integrated Circuit—$I^2C$). Some of these commands are reserved for a vendor for customizing the configuration and control aspects of the optoelectronic device 100. The disclosed systems and methods enable the use of such commands to load a firmware module into a memory space in the optoelectronic device 100. The firmware module may form a part of a firmware stored and being executed in the optoelectronic device 100. Alternatively, the firmware module may be stored and executed separately using the commands to implement a user-defined (or vendor defined) feature/function.

The firmware may be designed in a thread form which facilitates reusability and includes multiple firmware threads with each firmware thread controlling specific tasks. Such designed firmware module may alternately or additionally be configured to perform specific operations for the manufacturing process. There could be numerous functions that may be needed during the manufacturing process for tuning, finding ideal settings, etc. In the event that providing support for manufacturing processes causes the associated firmware image to exceed the space available, loadable firmware modules may be created that will perform manufacturing tasks. Such firmware modules may execute during the manufacturing process and be discarded before the module is shipped, although this is not required in all embodiments.

Alternately or additionally, a firmware may also be configured to add a field feature to a main loop of execution. To accomplish this, the firmware module can be added into a non-volatile memory. Such a firmware module can be loaded back to a reserved space on each reboot cycle of the optoelectronic device 100. The firmware module stored in the optoelectronic device 100 could execute minimal monitoring and control while still processing I$^2$C commands to perform a firmware upgrade. Thus, the upgrading of the firmware does not require a resetting of the firmware or the optoelectronic device 100.

In an example embodiment, the host 115 may be a mobile communication device configured to communicate with the optoelectronic device 100 through a wireless link. Such a mobile device may include a repository of firmware modules for multiple products, firmware versions, etc. The repository may be updated as new firmware versions are released. As mentioned above, the use of a wireless link may allow a field engineer to query the optoelectronic (or other) device 100, download debug firmware modules to the optical module, gather information, etc. The wireless link and the mobile communication device either alone or in combination may enable a field engineer to execute a debug operation at a data centre (housing the optoelectronic device 100) without having to open a rack up, or try getting a connection to the optical module in a tight space.

The commands could also be used to communicate a set of values (also referred to herein after as "a set of data values") to control aspects of execution of the firmware module after loading. For example, the set of values may correspond to flag values that could initiate execution of the firmware module or control the type of information being collected or returned after an execution of the firmware module. The control module 150 executes the firmware module upon receipt of a command, or flag values, or a combination of both, from the host 115

In an example implementation, the firmware module can be used to pass data or information to the optoelectronic device 100. Such passed data can be used to program memory (of the optoelectronic device 100) to force a specific action or to program or configure components thereof, etc.

Figure 3:
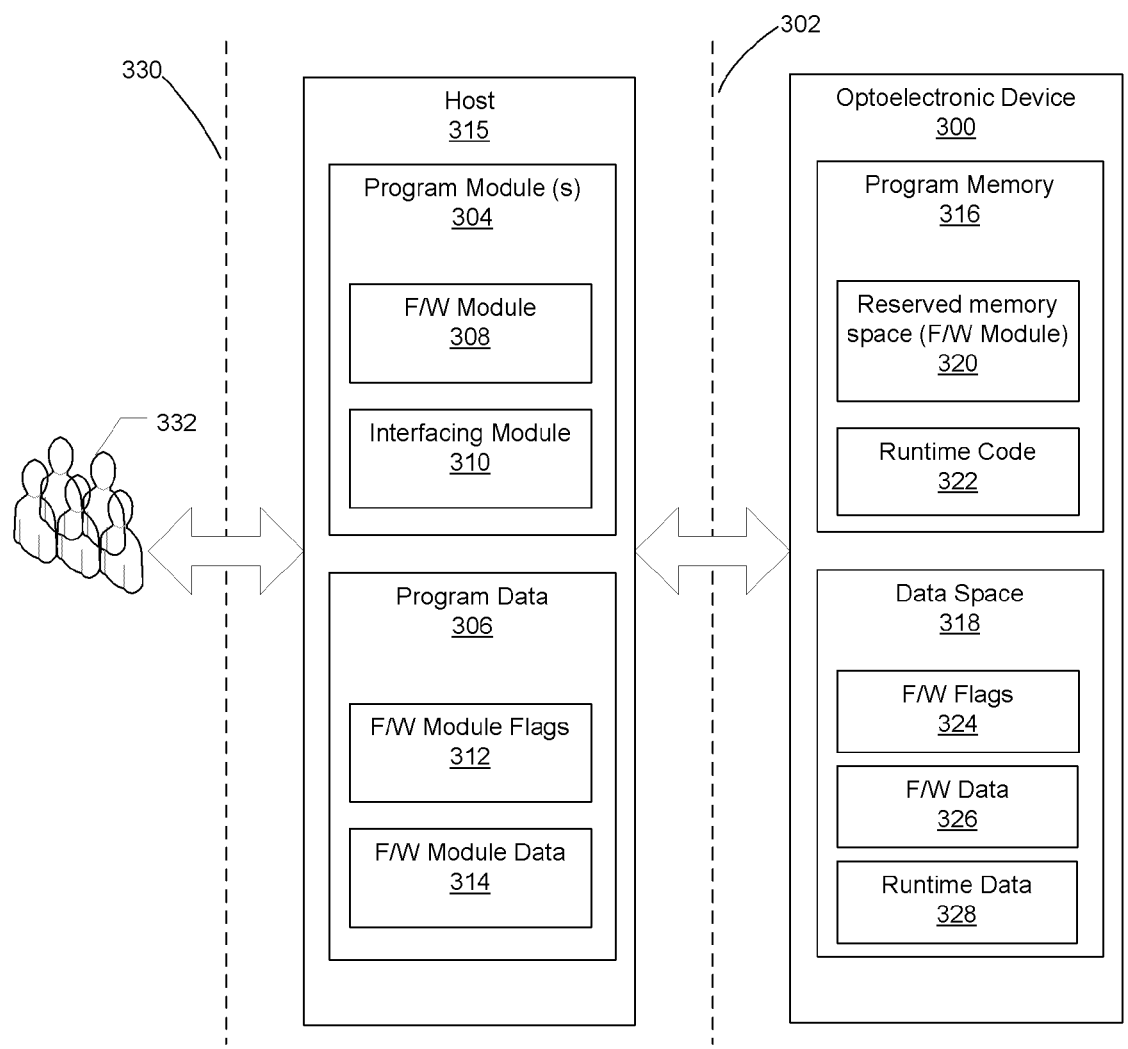
FIG. 3 depicts an example host and an example optical transponder in communication with each other according to an implementation of the present invention.

FIG. 3 illustrates an example host 315 and optoelectronic device 300 (implemented as a transponder) in communication with each other through a data communication interface 302. The host 315 and optoelectronic device 300 may correspond to the host 115 and optoelectronic device 100 of FIG. 1, respectively. The host 315, in one embodiment, includes a memory space. The memory space in the host 315 may include a program module 304 and program data 306 as shown in FIG. 3. The program module 304 stores application software, such as, but not limited to, a firmware (F/W) module 308, an interfacing module 310, and the like or any combination thereof The program data 306 includes input and output data values (variables) utilized by the various modules in the program module 304. For example, the program data 304 may include, but is not limited to, firmware (F/W) module flags 312, firmware (F/W) module data 314, and the like or any combination thereof.

In addition, FIG. 3 illustrates the optoelectronic device 300 in an example embodiment. Accordingly, the optoelectronic device 300 includes a memory space divided into a program memory 316 and a data space 318, respectively. The program memory 316 has a reserved memory space 320 and a runtime code 322 stored therein. The data space 318 includes F/W flags 324, F/W data 326, and runtime data 328. It is noted that the optoelectronic device memory space of FIG. 3 may correspond to one or more of the persistent memory 140 of FIG. 1 and the controller system memory 206 of FIG. 2.

In operation, the host 315 communicates a firmware module 308 to the optoelectronic device 300 through data communication interface 302 (e.g., I$^2$C communication interface). To this end, the host 315 may utilize a set of commands (e.g., I$^2$C commands) to transfer firmware module 308 through the data communication interface 302. The interfacing module 310 facilitates interfacing of the host 315 with the optoelectronic device 300. The optoelectronic device 300 receives and stores the firmware module 308 in the reserved memory space 320. The firmware module 308 is executable by the optoelectronic device 300 without resetting/suspending operations of the optoelectronic device 300. In an example embodiment, the host 315 transfers a plurality of firmware module(s) 308. In such an embodiment, the host system 315 may associate with each of the firmware modules 308 an identification tag. The identification tag for each firmware module 308 may help the host 315 issue instructions and data for the corresponding firmware module 308. Such identification tags also enable the optoelectronic device 300 to associate a particular instruction from the host 315 to the corresponding firmware module 308.

The optoelectronic device 300 has embedded software ("firmware", e.g., runtime code 322) to control the functional aspects of the optoelectronic device 300. The loading of the firmware module 308 does not interrupt an ongoing execution of the runtime code 322 in the optoelectronic device 300.

In conventional systems and methods for loading a firmware module, the optoelectronic device 300 would suspend the operations of the runtime code 322 upon receipt of the firmware module, because of which the optoelectronic device 300 is reset. During such a reset, any information associated with the ongoing operation would be lost. For example, the firmware might encounter an error in the optoelectronic device 300. To debug the error, the firmware might need an update for one of its constituent firmware modules. The firmware modules can be updated by loading a firmware image but the firmware will have to be reset, i.e., the execution of the firmware will have to be suspended in order to carry out the loading of an updated firmware module.

In another example implementation, the firmware module 308 is configurable thorough an editor or Graphical User Interface (GUI) 330 by one or more users 332. The user 332 configures the firmware module 308 to implement an updated feature. The firmware module 308 may be divided into a plurality of portions and each of the portions can be configured independently by the user. The interfacing module 310 facilitates an interaction with the user 332 through the editor or GUI 330.

In a successive progression, the host 315 communicates to the optoelectronic device 300 a set of values representing information associated with execution of the firmware module 308. The set of values may correspond to flag values set by the host 315 (stored in the F/W module flags 312) to execute the firmware module 308. Alternatively, the host 315 communicates to the optoelectronic device 300, one or more execution commands to execute the firmware module 308. The optoelectronic device 300 receives and stores the set of values (e.g., flag values) and stores them in the F/W flags 324 of the data space 318.

In addition, the host 315 can send additional data required for the execution of the firmware module 308. The optoelectronic device 300 receives and stores such additional data (e.g., from F/W module data 314) in the F/W data 326.

The control module in the optoelectronic device 300 executes the runtime code 322 for performing various functions, such as measurement, compensation, diagnostics, communication, and potentially other similar functions. The optoelectronic device 300 (and more specifically, its control module) continues the execution of the runtime code 322 even while receiving the firmware module 308. The optoelectronic device 300 utilizes the set of values (e.g., F/W flags 324) to introduce the execution of the firmware module 308 into the ongoing execution of the runtime code 322. The execution of the firmware 308 may become a part of a main loop of execution of the runtime code 322 (a firmware) in the optoelectronic device 300. The host 315 controls the execution of the firmware module 308 by specifying the time of execution and any other associated data.

The control module of the optoelectronic device 300 executes the firmware module 308 based on the set of data values, execution commands, or both. The execution of the firmware module 308 may result in associated output data, which can be stored by the control module in the runtime data 328. The host 315 can access the optoelectronic device 300 to retrieve the output data from the runtime data 328. Alternatively, the optoelectronic device 300 may return the output data to the host 315. The set of values received by the optoelectronic device 300 may correspond to flag values that signify the start and end of the execution. Alternately or additionally, the optoelectronic device 300 may receive commands or flag values to restart execution once data or information has been retrieved by the host 315 and/or returned to the host 315.

Figure 4:
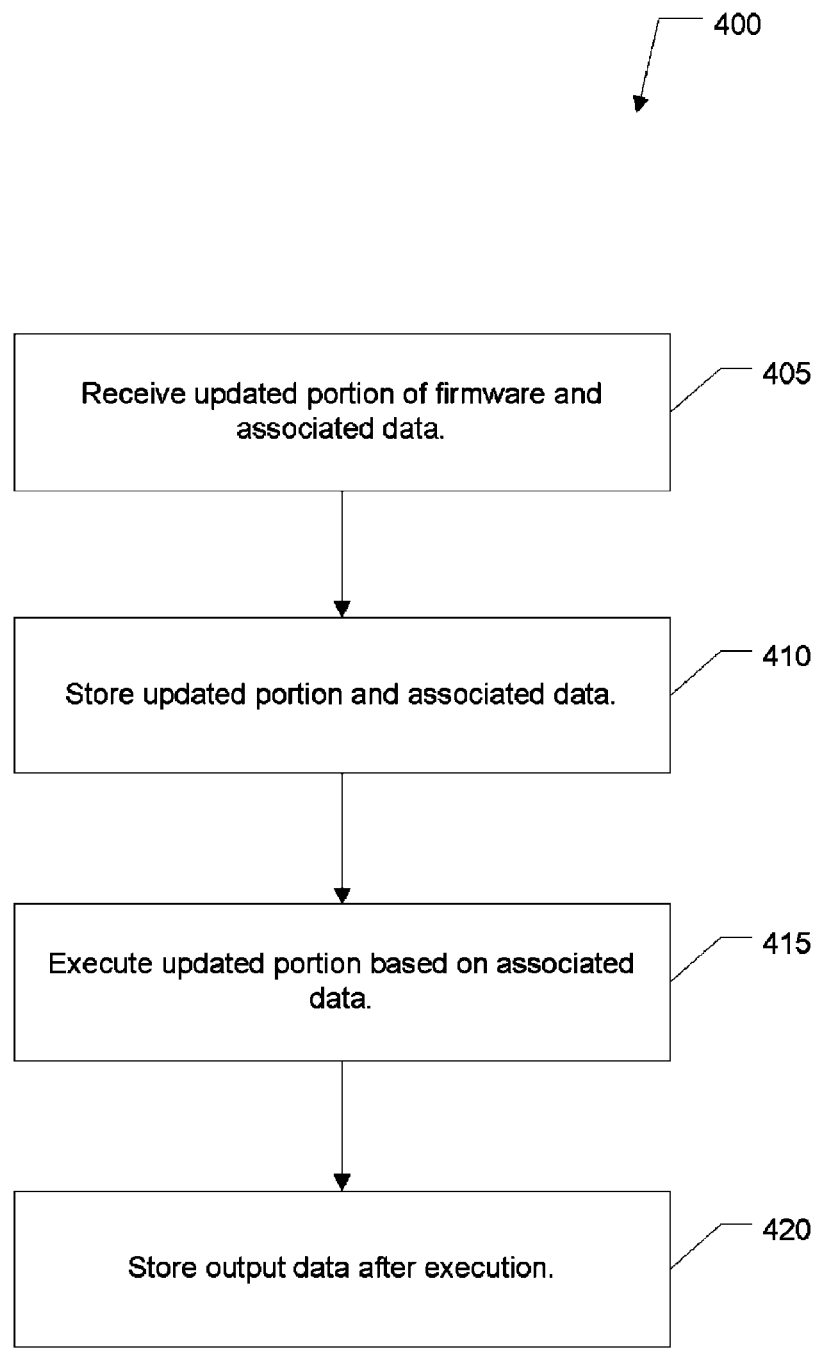
FIG. 4 illustrates a process flow of an example method for executing an updated firmware at an optoelectronic device according to embodiments of the present invention.

With reference now to FIGS. 3 and 4, an example process flow 400 for executing an updated firmware at optoelectronic device 300 is illustrated. Accordingly, at step 405, an updated portion of the firmware and associated data are received. In one embodiment, the optoelectronic device 300 receives an updated portion of the firmware from the host 315. The updated portion may correspond to a pre-compiled firmware module 308 that implements an update feature in the firmware stored in the optoelectronic device 300 as runtime code 322. In addition, the optoelectronic device 300 also receives associated data (e.g., F/W module data 314) from the host 315 that is utilized for controlling the updated portion (firmware module 308).

In an example embodiment, the optoelectronic device 300 also receives execution commands from the host 315. Such execution commands initiate and terminate the execution of the firmware module 308 in the optoelectronic device 300. Alternatively, the optoelectronic device 300 may receive flag values set by the host 315. The host 315 may set the flag values to start and end the execution as desired.

At step 410, the received updated portion of the firmware and the associated data are stored in the optoelectronic device 300. The optoelectronic device 300 stores the received updated portion (firmware module 308) in the program memory 316. The memory location for storing the firmware module 308 may be fixed or dynamically allocated. In case of a fixed memory location, the optoelectronic device 300 stores the received firmware module in the reserved memory space 320. In case of a dynamically allocated memory location, a plurality of updated portions (firmware modules 308) can be loaded onto the optoelectronic device 300. In such a scenario, a tagging scheme may be implemented in which the host 315 associates an identification tag with each of the updated portions (firmware modules 308). Any subsequent operation is carried out for the updated portion based on the identification tag. The optoelectronic device 300 stores the associated data in F/W data 326. The tagging scheme is also implemented to associate a given set of flag values with a corresponding firmware module.

In some optoelectronic devices, for example, having memory mapped modules, the loading or transfer of the firmware module 308 is performed using $I^2C$ commands. The optoelectronic device 300 stores the firmware module 308 and any associated data into a table, or across multiple tables. There could be separate tables for "data in" and "data out". The flag values can also be stored in tables. In certain scenarios, the optoelectronic device may not use the data communication interface, such as the $I^2C$ interface. In such scenarios, the host 315 may utilize reserved tables stored in the optoelectronic device 300 to load the firmware module 308, set flags, and write data/information into a firmware or read data/information from the firmware in the optoelectronic device 300.

Returning to the process flow 400, at step 415 the updated portion of the firmware is executed based on the associated data. For instance, a control module of the optoelectronic device 300 may execute the updated portion (firmware module 308) based on the execution commands or the flag values received from the host 315. The execution can either be initiated or stopped depending upon the flag values set by the host 315. Likewise, the execution can be stopped anytime on receipt of a corresponding execution stop command from the host 315. During execution, the firmware module 308 may collect data (e.g. F/W data 326) that can be returned to the host 315. Alternatively, data or information may be stored for a future retrieval operation by the host 315. The execution of the updated portion is performed without interrupting an ongoing execution of a non-updated portion of a firmware in the optoelectronic device 300.

At step 420, output data from the execution of the updated portion is stored. The execution of the firmware module 308 results in output data. The optoelectronic device 300 stores the output data in the F/W firmware data 326. The optoelectronic device 300 may receive a command from the host 315 requesting the output data. In such a case, the optoelectronic device 300 returns the output data to the host 315. The host 315 may issue additional commands to halt or restart the execution of the firmware module 308 once output data is retrieved.

Figure 5:
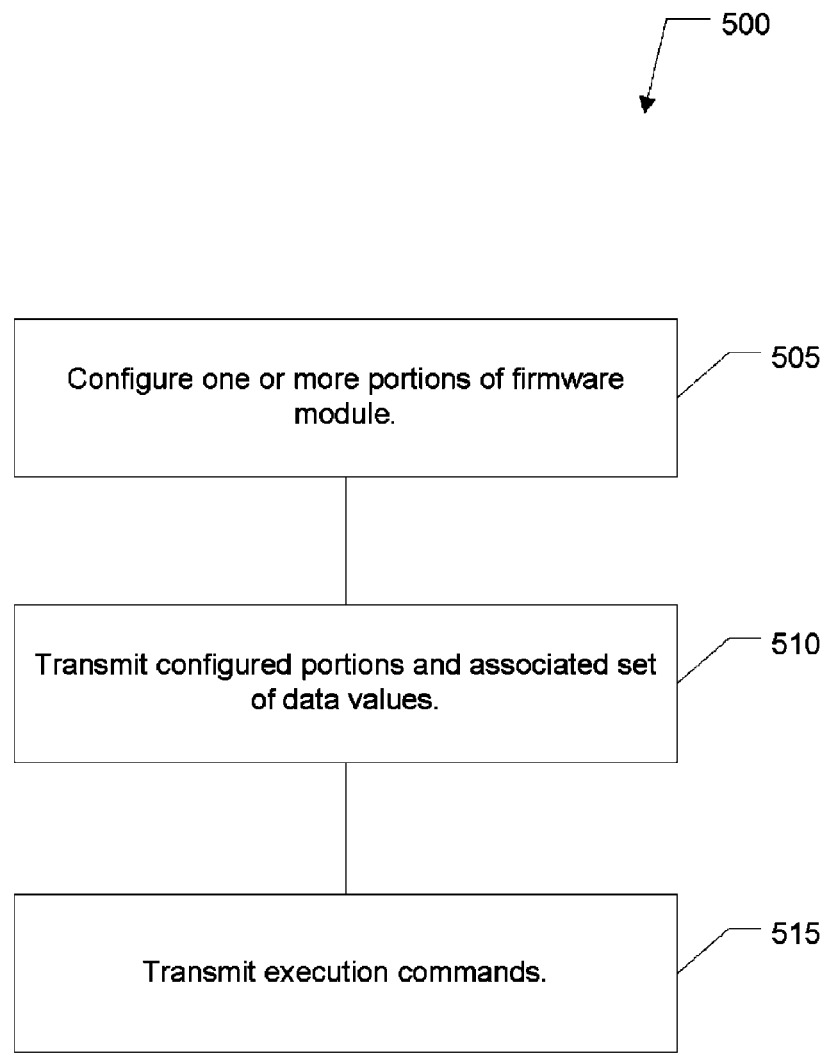
FIG. 5 illustrates yet another process flow of an example method for updating a firmware module in an optoelectronic device according to embodiments of the present invention.

With reference now to FIGS. 3 and 5, a process flow 500 of an example method for updating a firmware module in an optoelectronic device 300 is illustrated. According to an example implementation, at step 505, one or more portions of a firmware module are configured. The host 315 enables configuration of the firmware module 308 by a user 332 through an editor or graphical user interface 330. The firmware module 308 can be made configurable by defining the firmware module 308 into multiple parts or pieces/portions (explained in detail with reference to FIG. 6).

At step 510, the one or more configured portions (of the firmware module) and an associated set of data values are transmitted to the optoelectronic device. The host 315 may transmit the configured portions of the firmware module 308 by executing a command. The optoelectronic device 300 receives and stores the firmware module 308 in the program memory 316 using a static allocation or dynamic allocation of memory space. In an example implementation, the host 315 transmits the associated set of data values (e.g., F/W module data 314) through an $I^2C$ command for larger blocks of data. In case of small bits of data, the set of data values can be transmitted with the configured portion of the firmware module 308.

At step 515, execution commands are transmitted. The host 315 may issue execution commands (for immediate execution) along with the configured portions of the firmware module 308. If the host 315 utilizes flags for execution of the transmitted configured portions of the firmware 308, the flags (e.g. F/W module flags 312) are communicated to the optoelectronic device 300. If there are multiple portions of the firmware 308, then a tagging scheme can be implemented to link the memory location of the flag to a corresponding portion.

In a successive progression, the one or more configured portions are executed based on the set of data values. The optoelectronic device 300 executes the one or more configured portions on receipt of the execution commands from the host 315. In a case where the execution commands are specified for an immediate execution, the configured portion is executed immediately and an output data associated with the executed firmware module is returned.

Alternatively, the host 315 initiates execution by setting flag values. During execution, the configured portion of the firmware module may collect data or information that can be returned to the host 315. The host 315 might also read output data from the optoelectronic device 300. The host 315 may issue additional commands, set, or reset flags to halt execution of the one or more configured portions. The host 315 may also issue commands or set flag values to restart execution once the host 315 has retrieved data or information (output data).

Although FIGS. 4 and 5 have been described as a process flow of a multitude of steps, it is noted that no particular order is intended for the purposes of the ongoing description. Alternative example embodiments may have a different order of steps.

Figure 6:
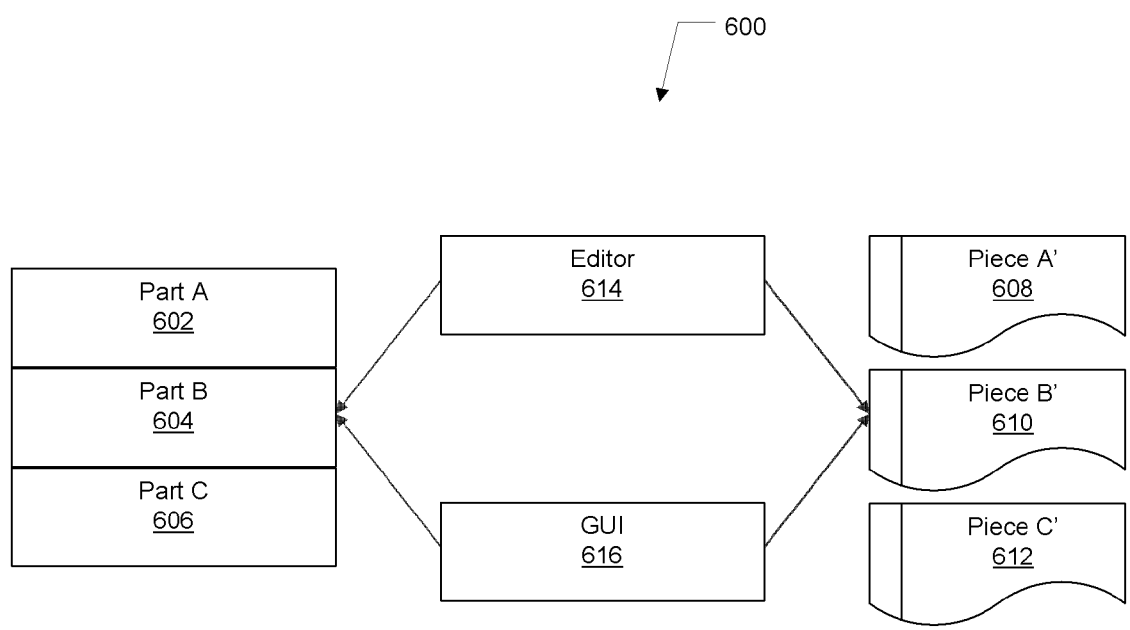
FIG. 6 illustrates embodiments of example firmware modules configurable by a user through an editor or graphical user interface (GUI).

FIG. 6 illustrates example firmware modules configurable by a user through an editor or graphical user interface (GUI). Accordingly, the firmware module 308 can be made configurable by defining a module into multiple parts—part A 602, part B 604, and part C 606, as shown in the Figure. The firmware module 308 can also be separated into multiple portions or pieces—piece A' 608, piece B' 610, and piece C 612 as shown in the Figure. One or more of the parts/pieces may represent an executable code. In an example implementation, one or more of the parts/pieces may correspond to control or configuration information. The host 315 loads the parts/pieces onto the optoelectronic device 300. The parts/pieces work together to perform tasks, log data, or retrieve data and/or information respectively.

In one embodiment, the host 315 enables modification/configuration of the parts/pieces that correspond to control or configuration information of the optoelectronic device 300. As shown in the Figure, such parts/pieces (e.g., part B 604, piece B' 610) can be configured by a user (e.g., user 332) utilizing an editor 614 or a GUI 616, both of which may correspond to the editor/GUI 330 of FIG. 3. It is noted that the configured/modified part or piece implements an update in the firmware module 308. The configurable part of the firmware module 308 may be configured and run, reconfigured and rerun as desired. The configurable piece can be modified and reloaded by itself to implement an update on the executable part of the optoelectronic device 300.

In an example implementation, the firmware module 308 may be configured for dynamic debug data logging. In such an implementation, the configurable part of the firmware module 308 could define one or more of: components being monitored, information being saved, location of information being saved, specification of event-driven or periodic gathering of information, frequency of periodic gathering of information, specification of wrapping around data flow and related sampling.

An example firmware module 308 configured by a user/editor allows the host 315 to extract information for debug without resetting/suspending the firmware (e.g., runtime code 322) in the optoelectronic device 300. The firmware module 308 also enables gathering of data or information without reloading a full image of the firmware or resetting the firmware. In addition, the firmware module 308 can also be used to take over normal monitoring or limited monitoring of firmware during a live update. It is also noted that additional firmware modules may be created, loaded, and executed as information is being gathered and analyzed by the firmware. In such a case, loading and execution of such a firmware module are handled separately for the different firmware modules.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of a host device loading a firmware module in an optoelectronic device, the method comprising:
   the optoelectronic device detecting an error condition in the optoelectronic device;
   the host device communicating the firmware module to the optoelectronic device, including an optical transmitter and an optical receiver, through a data communication interface of the optoelectronic device, the firmware module being loadable and executable without resetting or suspending an ongoing execution of runtime code in the optoelectronic device, the firmware module including a firmware update for performing a debugging operation on the optoelectronic device in order to determine the cause of the error condition in the optoelectronic module; and
   the host device communicating an execution command, a flag value, or a combination thereof that initiates execution of the firmware module to the optoelectronic device through the data communication interface.

2. The method of claim 1, wherein the firmware module includes a dynamically allocated complete linked code set or a portion of a code set.

3. The method of claim 1, further comprising, prior to communicating the firmware module to the optoelectronic device, configuring at least a portion of the firmware module based on a user input received through an editor or graphical user interface.

4. The method of claim 1, further comprising, prior to communicating the firmware module to the optoelectronic device:
   dividing the firmware module into a plurality of portions; and
   configuring one or more of the plurality of portions to implement an update feature in the firmware module.

5. The method of claim 1, wherein the data communication interface includes an inter-integrated circuit ($I^2C$) communication interface.

6. A method of executing an updated firmware in an optoelectronic device, the method comprising:
   the optoelectronic device detecting an error condition in the optoelectronic device;
   the optoelectronic device, including an optical transmitter and an optical receiver, receiving from a host device an updated portion of the firmware and data associated with the updated portion, the updated portion of the firmware including a firmware update for performing a debugging operation on the optoelectronic device in order to determine the cause of the error condition in the optoelectronic module; and
   executing the updated firmware based at least in part on the received data without interrupting an ongoing execution of runtime code in the optoelectronic device,
   wherein the data associated with the updated portion of the firmware includes an execution command, a flag value, or a combination thereof that initiates execution of the updated firmware.

7. The method of claim 6, further comprising, storing the updated portion and the data associated with the updated portion in a reserved storage space of the optoelectronic device.

8. The method of claim 6, further comprising, after executing the updated firmware based at least in part on the received data, storing output data associated with the execution of the updated firmware in the optoelectronic device or communicating output data associated with the execution of the updated firmware to the host device.

9. The method of claim 6, wherein the updated portion includes configuration, control information, or a combination thereof associated with the firmware.

10. A method of a host device updating a firmware module in an optoelectronic device, the method comprising:
    the optoelectronic device detecting an error condition in the optoelectronic device;
    the host device configuring one or more configurable portions of the firmware module, the one or more configurable portions defining one or more parameters for one or more executable portions of the firmware module, the one or more configurable portions of the firmware including a firmware update for performing a debugging operation on the optoelectronic device in order to determine the cause of the error condition in the optoelectronic module;
    the host device transmitting to the optoelectronic device, including an optical transmitter and an optical receiver, through a data communication interface:
       the one or more configured portions;
       and one or more execution commands, flag values, or a combination thereof that initiate execution of the firmware module, the firmware module being executable without suspending an ongoing execution of runtime code in the optoelectronic device.

11. The method as in claim 10, wherein configuring the one or more configurable portions of the firmware module includes receiving input from a user through an editor or graphical user interface (GUI).

12. The method as in claim 10, wherein the one or more flag values indicate when to end execution of the firmware module.

13. The method as in claim 10, wherein transmitting the one or more configured portions comprises associating one or more identification tags with the one or more configured portions.

14. The method of claim 10, wherein the one or more parameters defined by the one or more configured portions of the firmware module include one or more of:
    one or more components within the optoelectronic device to be monitored by the optoelectronic device;
    information to be saved by the optoelectronic device;
    a location for saving information;
    whether information is to be gathered by the optoelectronic device periodically or in response to one or more events; and
    if information is to be gather periodically, the frequency of the information gathering.

15. The method of claim 1, wherein the firmware module, when executed, causes a control module on the optoelectronic device to monitor a component of the optoelectronic device and to log debug data associated with the monitored component.

16. The method of claim 1, wherein a host device communicates the execution command, the flag value, or the combination thereof to the optoelectronic device in order for the host device to directly control the initiation or end of the execution of the firmware module in the optoelectronic device.

17. The method of claim 6, wherein the host device communicates the execution command, the flag value, or the combination thereof to the optoelectronic device in order for the host device to directly control the timing of the initiation or end of the execution of the updated firmware in the optoelectronic device.

18. The method of claim 1, wherein a data path of the host device communicating the firmware module, the execution command, the flag value, or a combination thereof to the optoelectronic device overlaps with a data path of the host device communicating data to the transmitter.

19. The method of claim 6, wherein the host device comprises a mobile communication device that communicates with the optoelectronic device over a wireless link.

20. The method of claim 10, wherein the data communication interface comprises a wireless link.

* * * * *